United States Patent
Chu et al.

(10) Patent No.: US 8,035,791 B2
(45) Date of Patent: Oct. 11, 2011

(54) DISPLAY PANEL AND ELECTRO-OPTICAL APPARATUS

(75) Inventors: Chih-Wei Chu, Hsinchu County (TW); Ming-Che Hsieh, Taipei (TW); Chung-Wei Liu, Changhua County (TW); Shih-Yu Wang, Changhua County (TW)

(73) Assignee: Au Optronics Corporation, Hsinchu (TW)

( * ) Notice: Subject to any disclaimer, the term of this patent is extended or adjusted under 35 U.S.C. 154(b) by 618 days.

(21) Appl. No.: 12/182,147

(22) Filed: Jul. 30, 2008

(65) Prior Publication Data

US 2009/0310079 A1    Dec. 17, 2009

(30) Foreign Application Priority Data

Jun. 11, 2008    (TW) ................................ 97121767 A

(51) Int. Cl.
*G02F 1/1339*    (2006.01)
(52) U.S. Cl. ........................................................ 349/155
(58) Field of Classification Search ........................ None
See application file for complete search history.

(56) References Cited

U.S. PATENT DOCUMENTS

| | | | |
|---|---|---|---|
| 6,304,308 B1 * | 10/2001 | Saito et al. ................... | 349/155 |
| 6,646,709 B2 | 11/2003 | Matsumoto | |
| 6,705,584 B2 | 3/2004 | Hiroshima et al. | |
| 6,882,399 B2 | 4/2005 | Park | |
| 6,965,424 B2 | 11/2005 | Liu et al. | |
| 7,009,675 B2 | 3/2006 | Han et al. | |
| 7,199,855 B2 | 4/2007 | Yoshimi et al. | |
| 2005/0286006 A1 * | 12/2005 | Yanagawa ..................... | 349/153 |

FOREIGN PATENT DOCUMENTS

| | | |
|---|---|---|
| JP | 06-018903 | 1/1994 |
| JP | 2000-039606 | 2/2000 |
| JP | 2000-171807 | 6/2000 |
| JP | 2003-215597 | 7/2003 |
| JP | 2006-184741 | 7/2006 |
| JP | 2006-201413 | 8/2006 |

* cited by examiner

*Primary Examiner* — Lucy Chien
(74) *Attorney, Agent, or Firm* — Jianq Chyun IP Office

(57) ABSTRACT

A display panel includes a first substrate, a second substrate, a sealant, a plurality of spacers, and a display medium layer. The first substrate has a pixel array and a peripheral circuit. The sealant, the spacers, and the display medium layer are disposed between the first and the second substrate. The pixel array is surrounded by the sealant and located on a portion of the peripheral circuit. A multi-layer conductive wiring structure is disposed in the region of the peripheral circuit covered with the sealant. The multi-layer conductive wiring structure includes first and second conductive wirings. The second conductive wirings are connected to the pixel array via the first conductive wirings. An extending direction of the first conductive wirings is substantially different from that of the second conductive wirings. The spacers are distributed at two opposite sides of the sealant and respectively located between two adjacent first conductive wirings.

8 Claims, 10 Drawing Sheets

DISPLAY PANEL AND ELECTRO-OPTICAL APPARATUS

CROSS-REFERENCE TO RELATED APPLICATION

This application claims the priority benefit of Taiwan application serial no. 97121767, filed on Jun. 11, 2008. The entirety of the above-mentioned patent application is hereby incorporated by reference herein and made a part of specification.

BACKGROUND OF THE INVENTION

1. Field of the Invention

The present invention generally relates to an electro-optical apparatus and, more particularly relates to a display panel.

2. Description of Related Art

FIG. 1A is a partial cross-sectional view of a conventional display panel. Referring to FIG. 1A, the display panel 110 includes a first substrate 120, a second substrate 130, a sealant 140, a plurality of ball spacers 150 (only one is shown in FIG. 1A), and a display medium layer 160. The first substrate 120 has a pixel array 120a and a peripheral circuit 120b connected to the pixel array 120a. The second substrate 130 is disposed above the first substrate 120. The sealant 140 is disposed between the first substrate 120 and the second substrate 130, and located on a portion of the peripheral circuit 120b. A conductive wiring structure 122 is disposed in the region of the peripheral circuit 120b covered with the sealant 140. The ball spacers 150 are disposed inside the sealant 140, for maintaining a gap g' between the first substrate 120 and the second substrate 130.

As shown in FIG. 1A, an insulating layer PV' is covered on the conductive wiring structure 122 for protecting the conductive wiring structure 122. In detail, as the sealant 140 contains water vapour and/or solvent, the conductive wiring structure 122 if directly contacting the sealant 140 may get corroded. Further, since the ball spacers 150 are rigid, the insulating layer PV' disposed between the ball spacers 150 and the conductive wiring structure 122 may produce certain buffering effect, so as to reduce the external force applied on the conductive wiring structure 122.

In order to reduce the area of the peripheral circuit, the display panel is designed in the trend of slim border. However, as the area of the peripheral circuit gets narrower, the layout space of the conductive wiring structure is increasingly reduced. Therefore, the above conductive wiring structure of a single conductive layer is changed to be formed by double conductive layers, as shown in FIG. 1B.

FIG. 1B is a partial cross-sectional view of another conventional display panel. Referring to FIG. 1B, the display panel 110' is similar to the display panel 110 in FIG. 1A, i.e., the ball spacers 150 are still disposed in the sealant 140. The main difference between the display panels in FIGS. 1A and 1B lies in that the conductive wiring structure in the display panel 110' is a multi-layer conductive wiring structure 122' constituted by the first conductive wirings 122a and the second conductive wirings 122b. An insulating layer GI' is disposed between the first conductive wirings 122a and the second conductive wirings 122b so as to prevent the first conductive wirings 122a from being electrically connected to the second conductive wirings 122b. Another insulating layer PV' is covered on the second conductive wirings 122b for protecting the second conductive wirings 122b.

Meanwhile, referring to FIG. 1B, though the multi-layer conductive wiring structure 122' is protected by the insulating layer PV' covered thereabove, the ball spacers 150 may still damage the insulating layer PV' under an excessive external force, and may even damage the multi-layer conductive wiring structure 122' below the insulating layer PV'.

SUMMARY OF THE INVENTION

Accordingly, the present invention is directed to a display panel, in which the spacers in the display panel will not damage the multi-layer conductive wiring structure in the region covered with the sealant.

The present invention is also directed to an electro-optical apparatus having the above display panel.

The present invention provides a display panel, which includes a first substrate, a second substrate, a sealant, a plurality of spacers, and a display medium layer. The first substrate has a pixel array and a peripheral circuit connected to the pixel array. The second substrate is disposed above the first substrate. The sealant is disposed between the first substrate and the second substrate. The pixel array is surrounded by the sealant and the sealant is located on a portion of the peripheral circuit, and a multi-layer conductive wiring structure is disposed in the region of the peripheral circuit covered with the sealant. In addition, the multi-layer conductive wiring structure includes a plurality of first conductive wirings and a plurality of second conductive wirings. The second conductive wirings are connected to the pixel array via the first conductive wirings, and an extending direction of the first conductive wirings is different from that of the second conductive wirings. The spacers are disposed between the first substrate and the second substrate and distributed at two opposite sides of the sealant. Further, each of the spacers is located between two adjacent first conductive wirings. The display medium layer is located between the first substrate and the second substrate and surrounded by the sealant.

The present invention also provides an electro-optical apparatus having the above display panel.

In the electro-optical apparatus and display panel provided by the present invention, the spacers are disposed at two sides of the sealant so that the multi-layer conductive wiring structure in the region covered by the sealant will not be damaged by the spacers.

In order to make the aforementioned and other objectives, features, and advantages of the present invention comprehensible, embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1A:
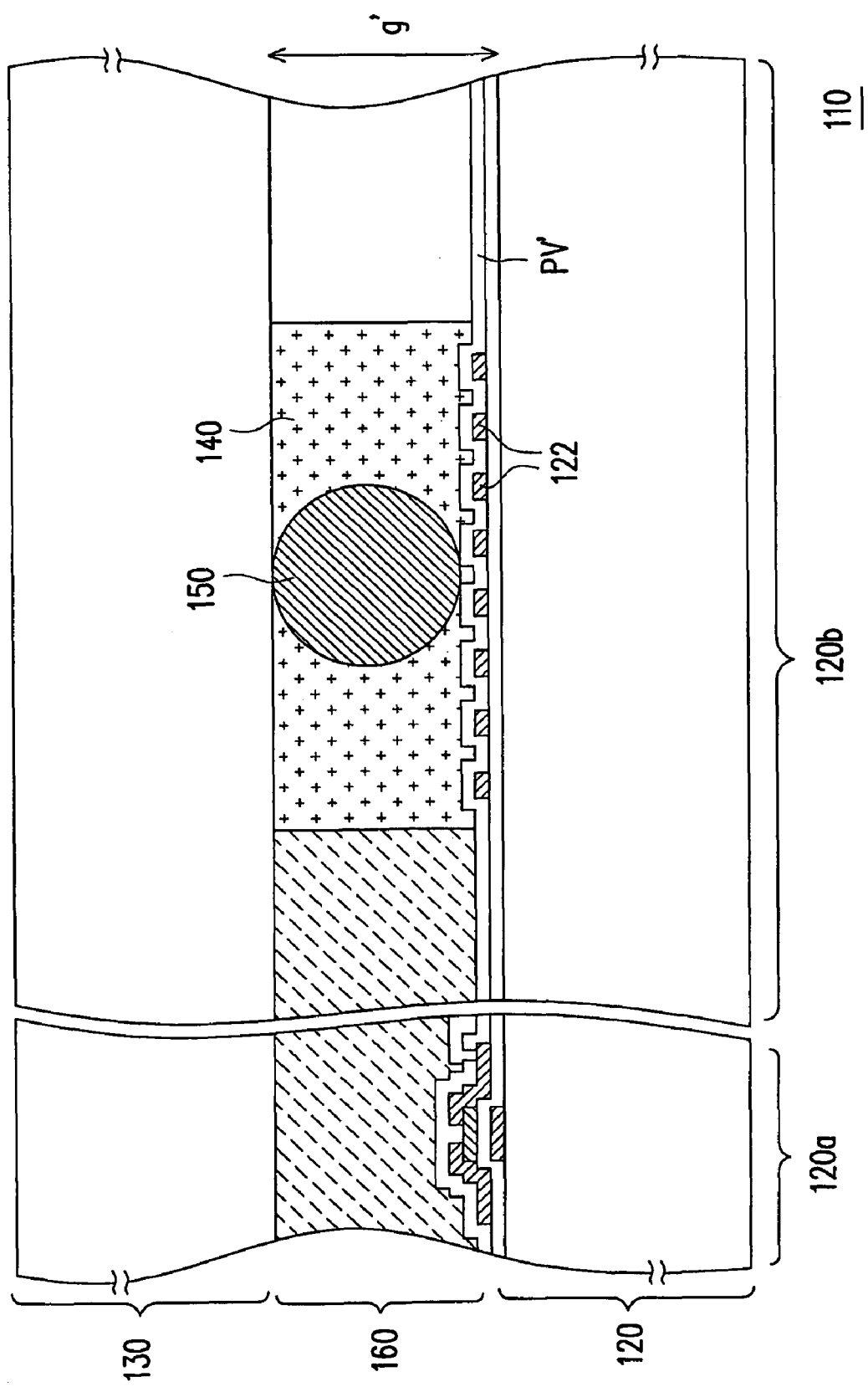
FIG. 1A is a partial cross-sectional view of a conventional display panel.
Figure 1B:
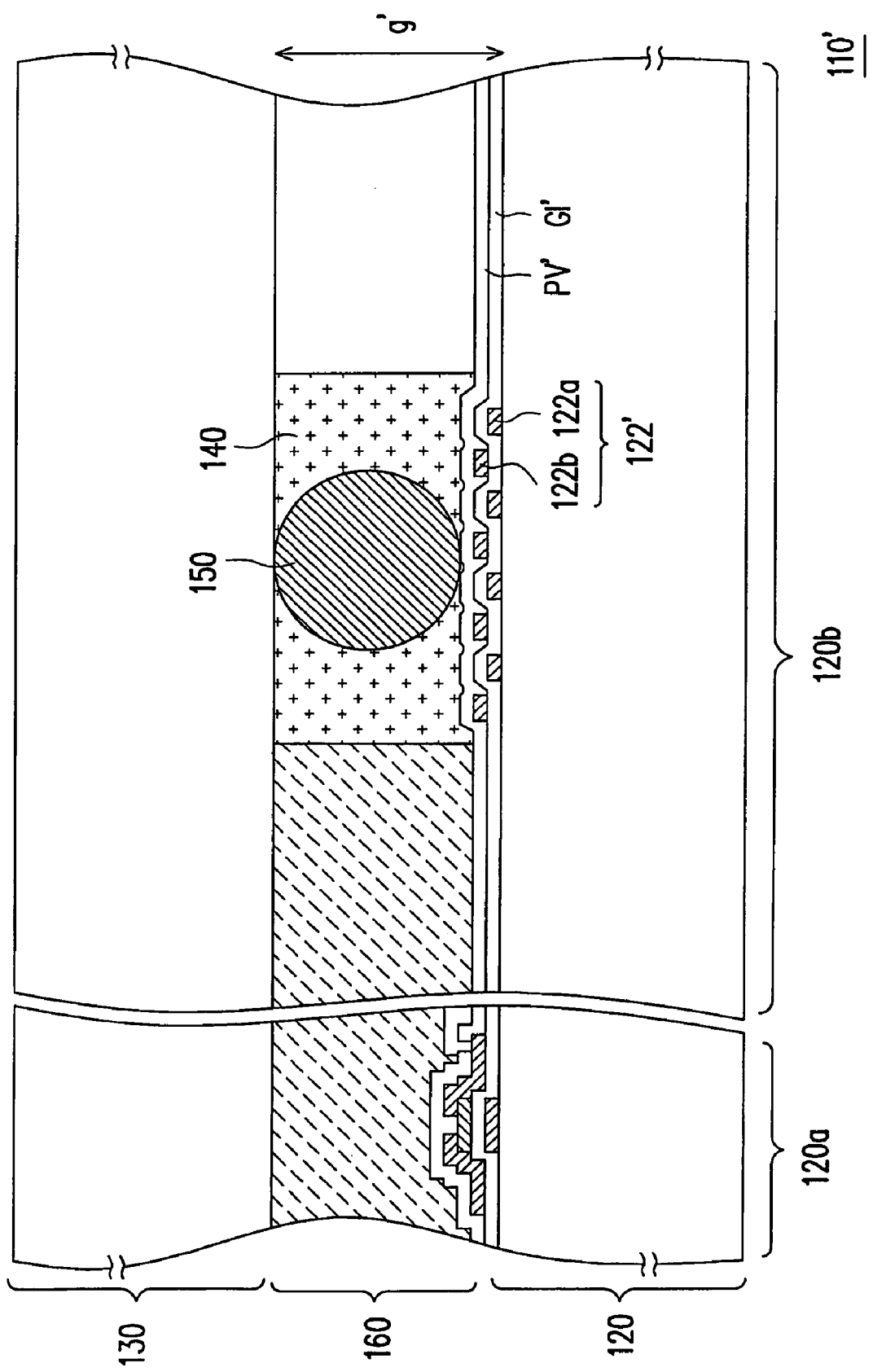
FIG. 1B is a partial cross-sectional view of another conventional display panel.

Reference will now be made in detail to the present preferred embodiments of the invention, examples of which are illustrated in the accompanying drawings. Wherever possible, the same reference numbers are used in the drawings and the description to refer to the same or like parts.

Figure 2:
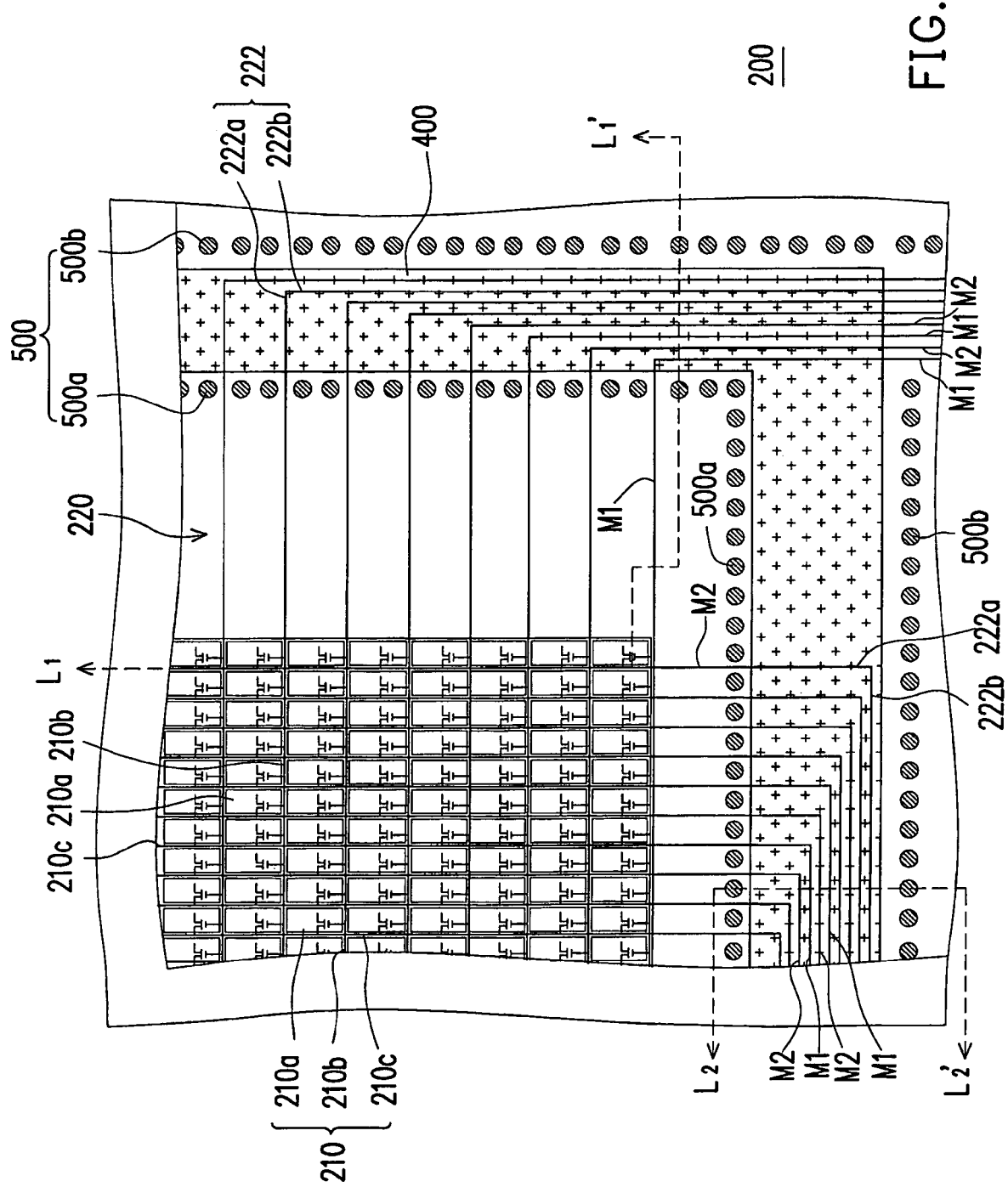
FIG. 2 is a partial top view of a display panel according to an embodiment of the present invention.
Figure 2A:
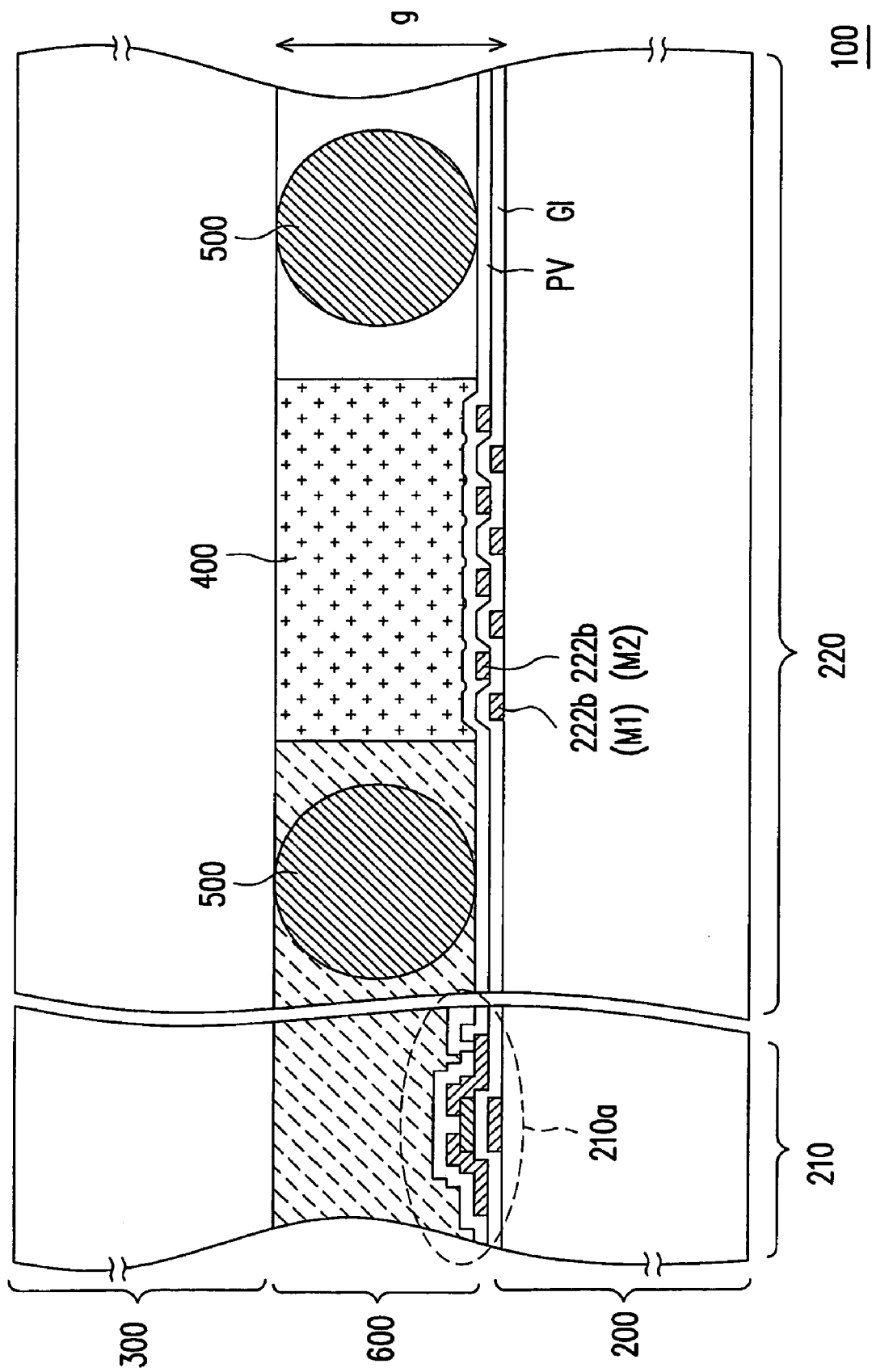
FIG. 2A is a cross-sectional view taken along a line $L_1$-$L_1$' in FIG. 2.

FIG. 2 is a partial top view of a display panel according to an embodiment of the present invention. FIG. 2A is a cross-sectional view taken along a line $L_1$-$L_1$' in FIG. 2. FIG. 2 only shows a portion of a first substrate 200 in the display panel 100. Referring to FIGS. 2 and 2A, the display panel 100 of this embodiment includes a first substrate 200, a second substrate 300, a sealant 400, a plurality of spacers 500, and a display medium layer 600. The first substrate 200 has a pixel array 210 and a peripheral circuit 220 connected to the pixel array 210. The second substrate 300 is disposed above the first substrate 200. The sealant 400 is disposed between the first substrate 200 and the second substrate 300. The pixel array 210 is surrounded by the sealant 400 and the sealant is located on a portion of the peripheral circuit 220. A multi-layer conductive wiring structure 222 is disposed in the region of the peripheral circuit 220 covered with the sealant 400. The multi-layer conductive wiring structure 222 includes a plurality of first conductive wirings 222a and a plurality of second conductive wirings 222b. In addition, the second conductive wirings 222b are connected to the pixel array 210 via the first conductive wirings 222a, and an extending direction of the first conductive wirings 222a is substantially different from that of the second conductive wirings 222b.

For example, in this embodiment, the first conductive wirings 222a are substantially perpendicular to the sealant 400, and the extending direction of the second conductive wirings 222b is substantially parallel to that of the sealant 400. However, in other embodiments, the first conductive wirings 222a and the sealant 400 may be across.

In FIG. 2A, an insulating layer GI is disposed between a film layer M1 of the first conductive wirings 222a and a film layer M2 of the second conductive wirings 222b so as to prevent the first conductive wirings 222a from being electrically connected to the second conductive wirings 222b. Another insulating layer PV is disposed on the second conductive wirings 222b for protecting the second conductive wirings 222b.

The spacers 500 are disposed between the first substrate 200 and the second substrate 300 and distributed at two opposite sides of the sealant 400. Further, each of the spacers 500 is located between two adjacent first conductive wirings 222a. Furthermore, the spacers 500 of this embodiment are disposed at positions where no multi-layer conductive wiring structure 222 is formed. In other words, in this embodiment, no conductive wiring structure 222 exists below the spacers 500.

The display medium layer 600 is located between the first substrate 200 and the second substrate 300 and is surrounded by the sealant 400.

In order to dispose the display medium layer 600 between the first substrate 200 and the second substrate 300, a gap g must be maintained between the first substrate 200 and the second substrate 300. However, in this embodiment, no spacers 500 are disposed in the sealant 400. That is to say, in this embodiment, the sealant 400 is mainly adopted to make the first substrate 200 adhered to the second substrate 300 instead of maintaining a gap g there-between. Therefore, the spacers 500 are disposed at two opposite sides of the sealant 400 so as to effectively maintain a gap g between the first substrate 200 and the second substrate 300.

It is noted that the spacers 500 of this embodiment include a plurality of first spacers 500a and a plurality of second spacers 500b. The first spacers 500a are surrounded by the sealant 400, and the second spacers 500b are disposed outside the sealant 400.

In detail, during the assembly of the first substrate 200 and the second substrate 300, a pressure is applied to the first substrate 200 and the second substrate 300 respectively to ensure that the assembly can be performed successfully. Here, the first spacers 500a, the second spacers 500b, the insulating layer PV, and the film layers below the insulating layer PV bear the pressure applied during the assembly. However, when the pressure on the first spacers 500a and the second spacers 500b is excessive, the first spacers 500a and the second spacers 500b may bring damages to the insulating layer PV and the film layers below the insulating layer PV. In this embodiment, the first spacers 500a and the second spacers 500b are disposed at positions where no multi-layer conductive wiring structure 222 is formed. Thus, the first conductive wirings 222a or the second conductive wirings 222b will not bear the pressure exerted by the spacers 500. In this manner, the first conductive wirings 222a and the second conductive wirings 222b may not be damaged by the spacers 500, and scan lines 210b and data lines 210c respectively connected to the first conductive wirings 222a and the second conductive wirings 222b can accurately transmit a signal to the pixel units 210a.

In this embodiment, the pixel array 210 includes a plurality of pixel units 210a arranged in an array, a plurality of scan lines 210b, and a plurality of data lines 210c. The scan lines 210b and the data lines 210c are both electrically connected to the pixel units 210a. For example, the scan lines 210b are electrically connected to gates of transistors (not shown) in the pixel units 210a, the data lines 210c are electrically connected to sources of the transistors (not shown) in the pixel units 210a, and the transistors (not shown) in the pixel units 210a are electrically connected to pixel electrodes (not shown). In addition, a part of the first conductive wirings 222a are connected to the scan lines 210b, and the other part of the first conductive wirings 222a are connected to the data lines 210c.

Specifically, the part of the first conductive wirings 222a connected to the scan lines 210b are electrically connected to gate drivers (not shown) via the second conductive wirings 222b, and thus the scan lines 210b may transmit scan signals generated by the gate drivers to the pixel units 210a. Further, the part of the first conductive wirings 222a connected to the data lines 210c are electrically connected to source drivers (not shown) via the second conductive wirings 222b, and thus the data lines 210c may transmit data signals generated by the source drivers to the pixel units 210a.

Figure 2B:
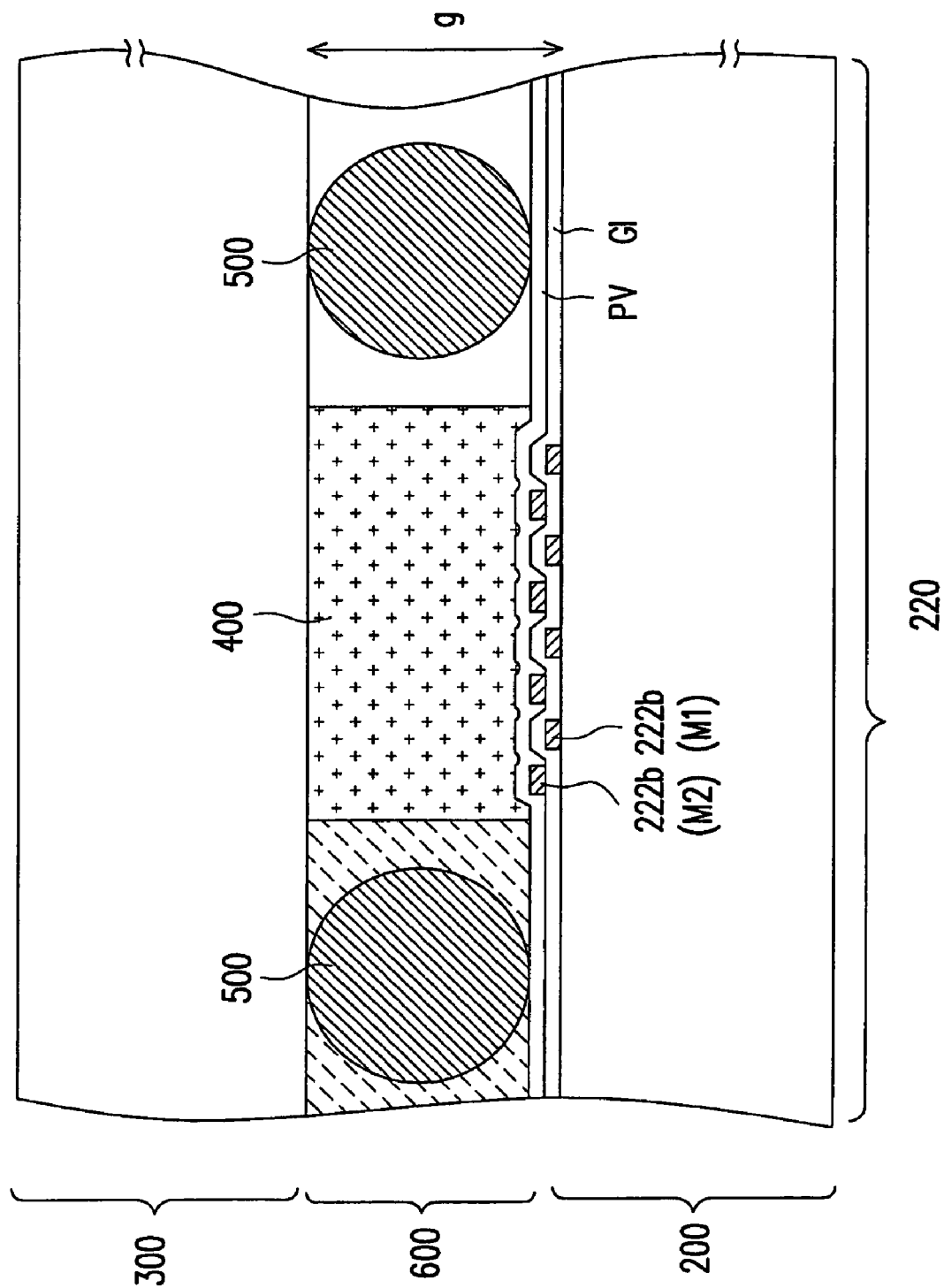
FIG. 2B is a cross-sectional view taken along a line $L_2$-$L_2$' in FIG. 2.

As shown in FIG. 2A, the part of the first conductive wirings 222a connected to the scan lines 210b are constituted by, for example, the first conductive wiring layer M1, and the second conductive wirings 222b connected to the part of the first conductive wirings 222a are constituted by the first conductive wiring layer M1 and the second conductive wiring layer M2. In addition, two adjacent second conductive wirings 222b belong to different film layers. This design helps to reduce the area of the peripheral circuit 220. It should be noted that the pixel units 210a in FIG. 2A are represented by the positions of the transistors (not shown), and the number of the transistor may be one or more. Further, the transistor in FIG. 2A is configured to have a bottom gate structure, and may also be configured to have a top gate structure or other suitable structures. On the other hand, the part of the first conductive wirings 222a connected to the data lines 210c are constituted by, for example, the second conductive wiring layer M2, and the second conductive wirings 222b connected to the part of the first conductive wirings 222a are constituted by the first conductive wiring layer M1 and the second conductive wiring layer M2, as shown in FIG. 2B. FIG. 2B is a cross-sectional view taken along a line $L_2$-$L_2'$ in FIG. 2. In FIG. 2B, two adjacent second conductive wirings 222b belong to different film layers.

Accordingly, since no spacers 500 are disposed in the sealant 400, this embodiment can prevent the first conductive wirings 222a and the second conductive wirings 222b from being damaged by the spacers 500 when applied in a display panel 100 with slim borders.

Figure 3:
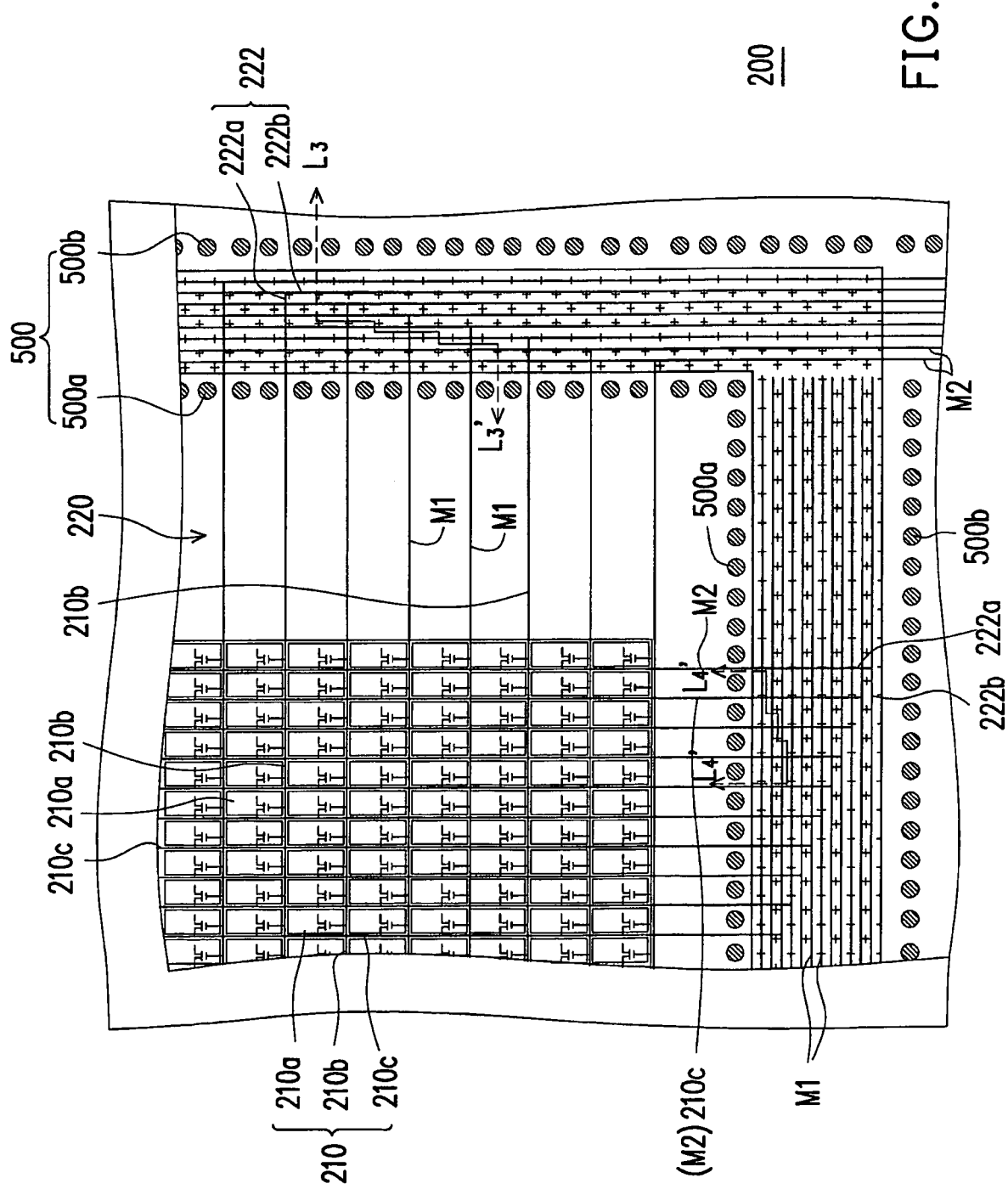
FIG. 3 is a partial top view of another display panel according to an embodiment of the present invention.

In other embodiments, the second conductive wirings 222b may have other configurations, for example, the configurations as shown in FIG. 3. FIG. 3 is a partial top view of another display panel according to an embodiment of the present invention. Referring to FIG. 3, the second conductive wirings 222b are uniformly disposed in the region covered with the sealant 400. Thus, the unevenness between the sealant 400 and the first substrate 200 can be significantly reduced, so as to further enhance the adhesion there-between.

Figure 3A:
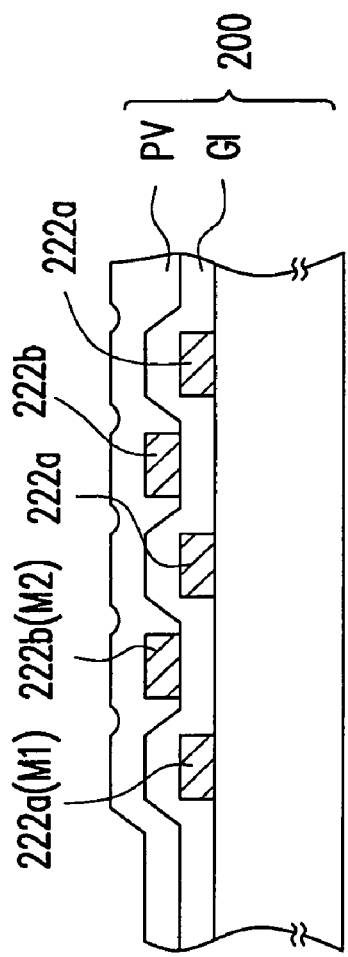
FIG. 3A is a cross-sectional view taken along a line L₃-L₃' in FIG. 3.
Figure 3B:
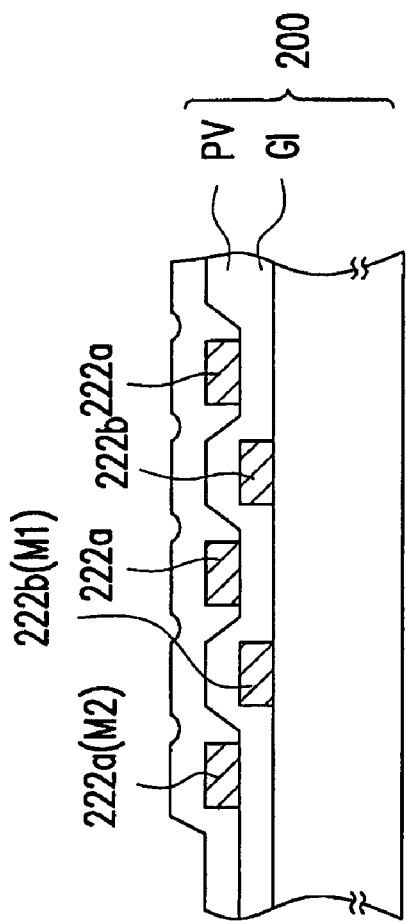
FIG. 3B is a cross-sectional view taken along a line L₄-L₄' in FIG. 3.

FIG. 3A is a cross-sectional view taken along a line $L_3$-$L_3'$ in FIG. 3, and FIG. 3B is a cross-sectional view taken along a line $L_4$-$L_4'$ in FIG. 3. Referring to FIGS. 3 and 3A first, the part of the first conductive wirings 222a connected to the scan lines 210b are constituted by, for example, the first conductive wiring layer M1, and the second conductive wirings 222b connected to the part of the first conductive wirings 222a are constituted by, for example, the second conductive wiring layer M2. Referring to FIGS. 3 and 3B, the part of the first conductive wirings 222a connected to the data lines 210c are constituted by, for example, the second conductive wiring layer M2, and the second conductive wirings 222b connected to the part of the first conductive wirings 222a are constituted by, for example, the first conductive wiring layer M1. In brief, the part of the first conductive wirings 222a (i.e., the first conductive wiring layer M1) connected to the scan lines and the part of the first conductive wirings 222a (i.e., the second conductive wiring layer M2) connected to the data lines belong to different film layers.

Figure 4:
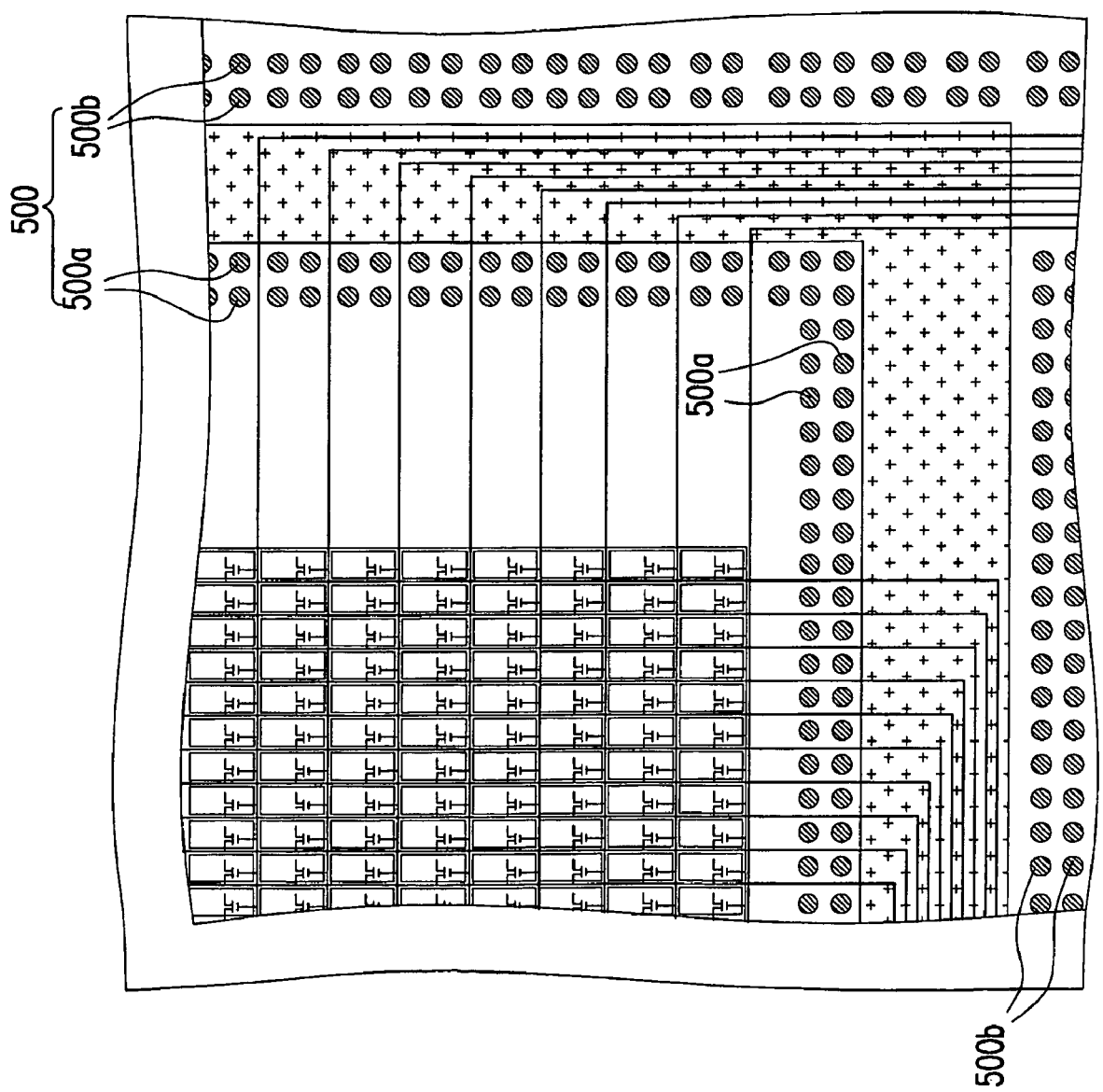
FIG. 4 is a schematic view illustrating arrangement manners of first and second spacers according to an embodiment of the present invention.

The first spacers 500a and the second spacers 500b are, for example, arranged along an annular track between the first substrate 200 and the second substrate 300. However, in order to enhance the supporting force between the first substrate 200 and the second substrate 300, the first spacers 500a and the second spacers 500b may also be arranged along two annular tracks respectively between the first substrate 200 and the second substrate 300, as shown in FIG. 4.

Figure 5:
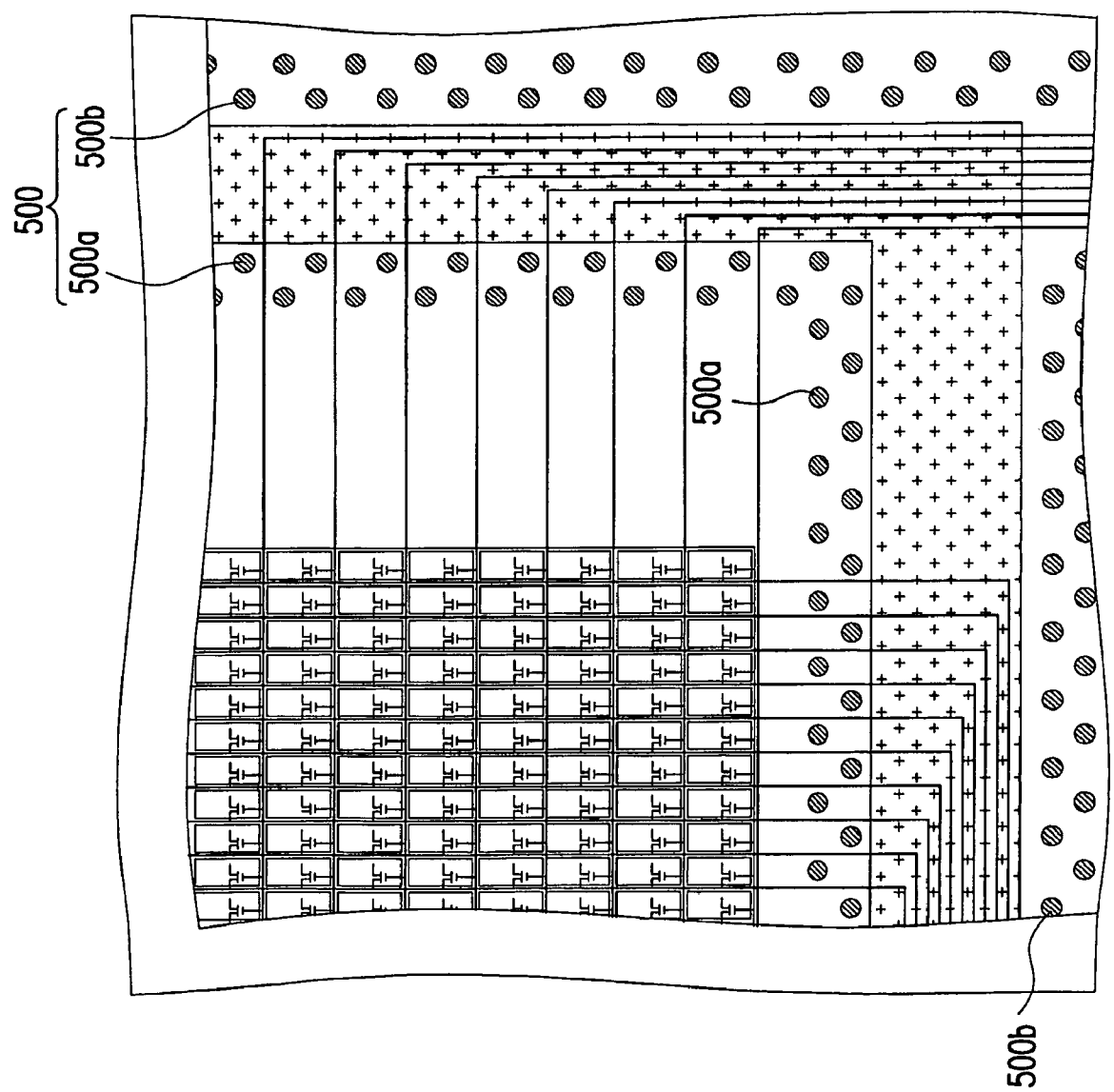
FIG. 5 is a schematic view illustrating arrangement manners of first and second spacers according to another embodiment of the present invention.

The configurations of the first spacers 500a and the second spacers 500b of the present invention is not limited to the above. In other embodiments, the first spacers 500a and the second spacers 500b may also be arranged in a staggered manner between the first substrate 200 and the second substrate 300, as shown in FIG. 5. Definitely, the designer may arrange the first spacers 500a or the second spacers 500b along an annular track, and the other in a staggered manner, or in any combination of the two manners according to actual requirements.

In this embodiment, the spacers 500 are, for example, ball spacers. However, in other embodiments, the spacers 500 may also be photo-spacers, or other structures capable of maintaining the gap g, or any combination thereof. In other words, the configuration or material of the spacers 500 is not limited by the present invention.

Figure 6:
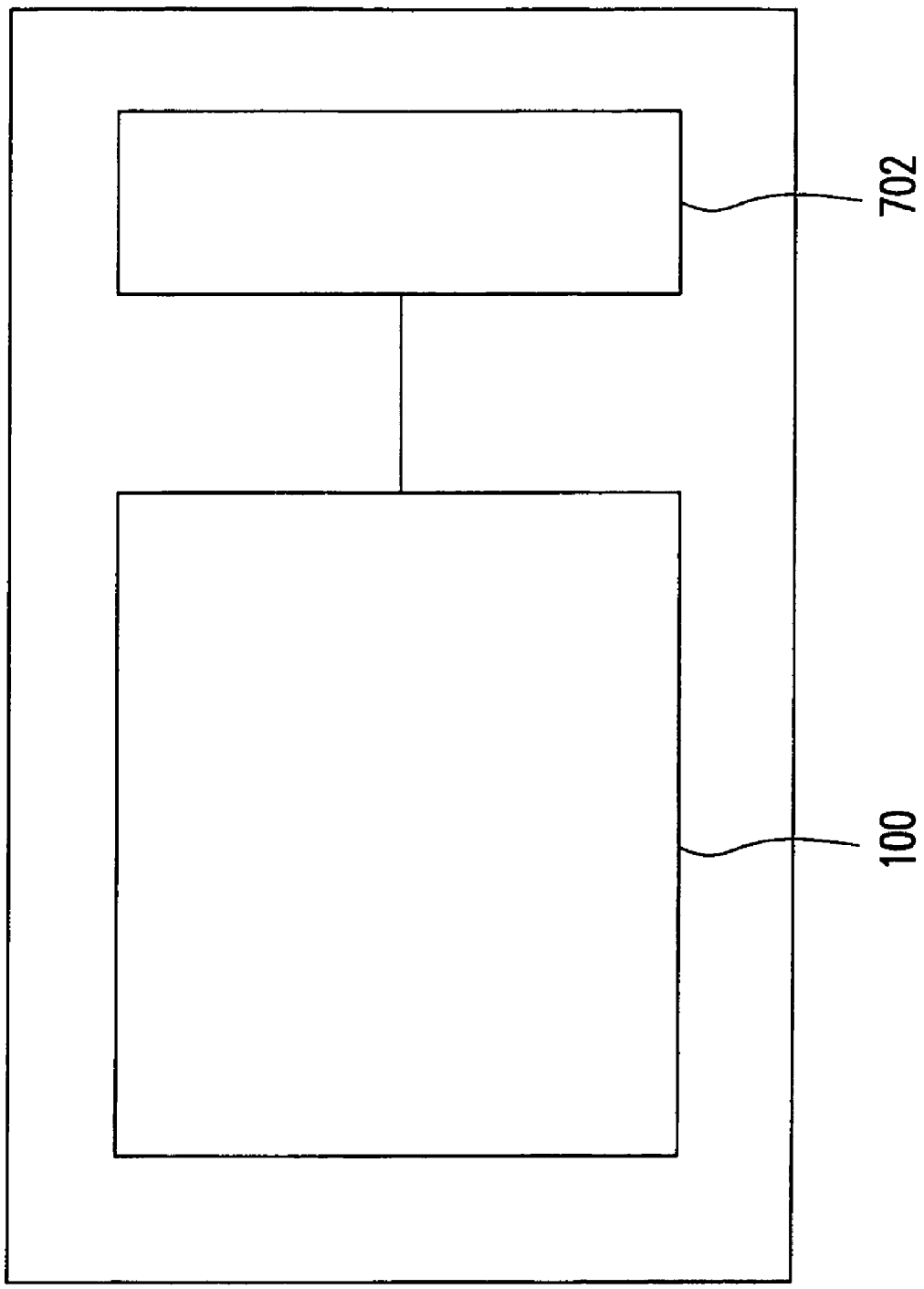
FIG. 6 is a schematic view of an electro-optical apparatus according to an embodiment of the present invention.

The display panel 100 can be applied in an electro-optical apparatus, and the architecture of the electro-optical apparatus is shown in FIG. 6. FIG. 6 is a schematic view of the electro-optical apparatus according to an embodiment of the present invention. Referring to FIG. 6, the electro-optical apparatus 700 of this embodiment includes a display panel 100 and an electronic element 702 electrically connected to the display panel 100. In this embodiment, the electronic element 702 may be a control element, an operating element, a processing element, an input element, a memory element, a driving element, a light-emitting element, a protection element, a sensing element, a detection element, or other functional elements, or any combination thereof. The electro-optical apparatus 700 may be a portable product (for example, a cell-phone, video camera, camera, notebook computer, game player, watch, music player, email transceiver, map navigator, digital photo, or the like), an audio-visual product (such as a media player), a screen, a TV set, a billboard, or a panel in a projector.

When the display medium layer 600 in the display panel 100 is made of a liquid crystal material, the display panel 100 is an LCD panel (for example, a transmissive, transflective, reflective, color filter on array, array on color filter, vertical alignment (VA), in-plane switching (IPS), multi-domain vertical alignment (MVA), twisted nematic (TN), super-twisted nematic (STN), patterned vertical alignment (PVA), super-patterned vertical alignment (S-PVA), advanced super-view (ASV), fringe field switching (FFS), continuous pinwheel alignment (CPA), axially symmetric aligned microcell (ASM), optical compensation bend (OCB), super in-plane switching (S-IPS), advanced super in-plane switching (AS-IPS), ultra fringe field switching (UFFS), polymer stablized alignment, dual-view, triple-view, or three-dimensional display panel, or other types of panels, or any combination of the above). In addition, the LCD panel is also called a non-self-luminous display panel. If the display medium layer 600 is made of an electroluminescent material, the display panel 100 is an electroluminescent display panel (for example, a phosphor electroluminescent or fluorescence electroluminescent display panel, or a combination thereof). The electroluminescent display panel is also called a self-luminous display panel, and the electroluminescent material is an organic or inorganic material, or a combination thereof. In addition, the molecules in the above material include small molecules, macomolecules, or a combination thereof. Further, if the display medium layer 600 is made of a liquid crystal material and an electroluminescent material at the same time, the display panel 100 is a hybrid or half-self-luminous display panel.

In view of the above, in the conventional designs of a display panel, the spacers are usually disposed in the sealant, and thus the spacers may directly or indirectly cause damages to the conductive wiring structure below the sealant. However, with the popularization of a display panel with slim borders, a multi-layer conductive wiring structure is adopted to reduce the area of the peripheral circuit, such that the display panel thus achieves slim borders. Therefore, the problem that the spacers may cause damages to the multi-layer conductive wiring structure is in urgent need of solution.

In the display panel of the present invention, the spacers are disposed at two sides of the sealant, so the multi-layer conductive wiring structure in the region covered with the sealant may not be damaged under the pressure exerted by the spacers. Therefore, the problem that the multi-layer conductive wiring structure may be damaged by the spacers in the design of a display panel with slim borders can be solved.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A display panel, comprising:
   a first substrate comprising a pixel array and a peripheral circuit connected to the pixel array;
   a second substrate disposed above the first substrate; and
   a sealant disposed between the first substrate and the second substrate, wherein the pixel array is surrounded by the sealant and the sealant is located on a portion of the peripheral circuit, a multi-layer conductive wiring structure is disposed in the region of the peripheral circuit covered with the sealant, and the multi-layer conductive wiring structure comprises:
   a plurality of first conductive wirings;
   a plurality of second conductive wirings connected to the pixel array via the first conductive wirings, wherein an extending direction of the first conductive wirings is substantially different from that of the second conductive wirings; and
   a plurality of spacers disposed between the first substrate and the second substrate and distributed at two opposite sides of the sealant, wherein the spacers are respectively located between two adjacent first conductive wirings, the spacers are disposed at positions on the first substrate where no multi-layer conductive wiring structure is formed, and no spacer is disposed in the sealant; and
   a display medium layer located between the first substrate and the second substrate and surrounded by the sealant.

2. The display panel according to claim 1, wherein the pixel array comprises:
   a plurality of pixel units;
   a plurality of scan lines electrically connected to the pixel units; and
   a plurality of data lines electrically connected to the pixel units, wherein a part of the first conductive wirings are connected to the scan lines, and the other part of the first conductive wirings are connected to the data lines.

3. The display panel according to claim 2, wherein the part of the first conductive wirings connected to the scan lines and the part of the first conductive wirings connected to the data lines are different layers.

4. The display panel according to claim 1, wherein the spacers comprise ball spacers or photo-spacers.

5. The display panel according to claim 1, wherein the spacers comprise:
   a plurality of first spacers surrounded by the sealant, wherein the first spacers are respectively located between two adjacent first conductive wirings; and
   a plurality of second spacers disposed outside the sealant.

6. The display panel according to claim 5, wherein at least one of the first spacers or the second spacers is arranged along at least one annular track or arranged in a staggered manner.

7. The display panel according to claim 1, wherein the first conductive wirings and the sealant are across, and the extending direction of the second conductive wirings is substantially parallel to that of the sealant at the same positions.

8. An electro-optical apparatus, comprising the display panel according to claim 1.

* * * * *